Oct. 31, 1944.   G. R. UNTHANK ET AL   2,361,577
APPARATUS FOR SEPARATING OIL FROM WATER CONTAMINATED THEREWITH
Filed Sept. 5, 1942
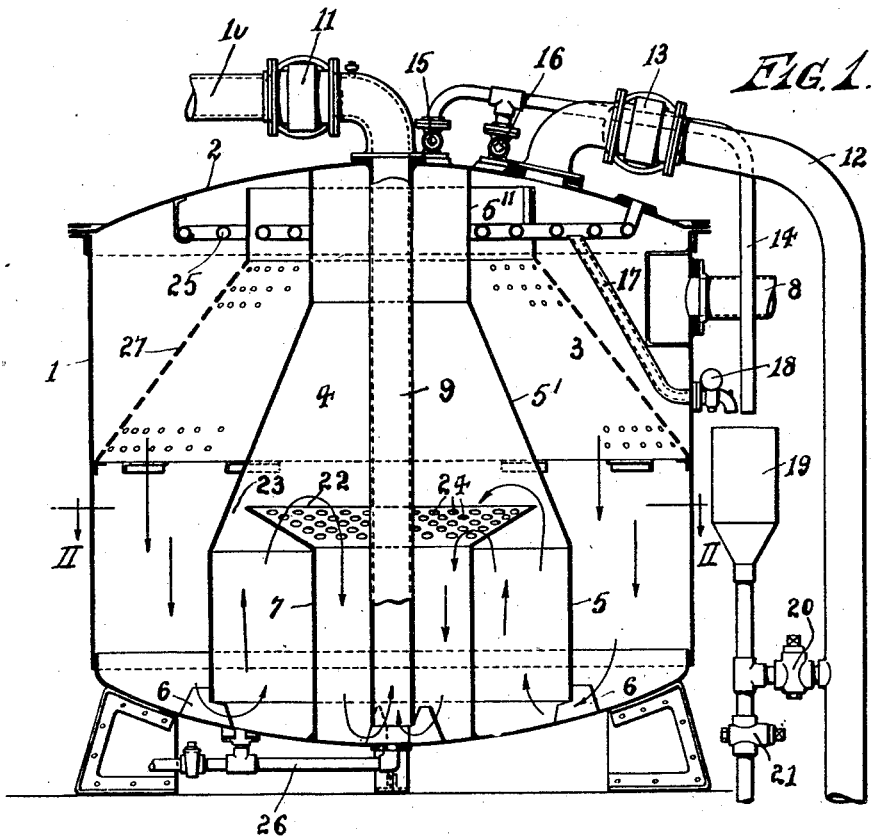
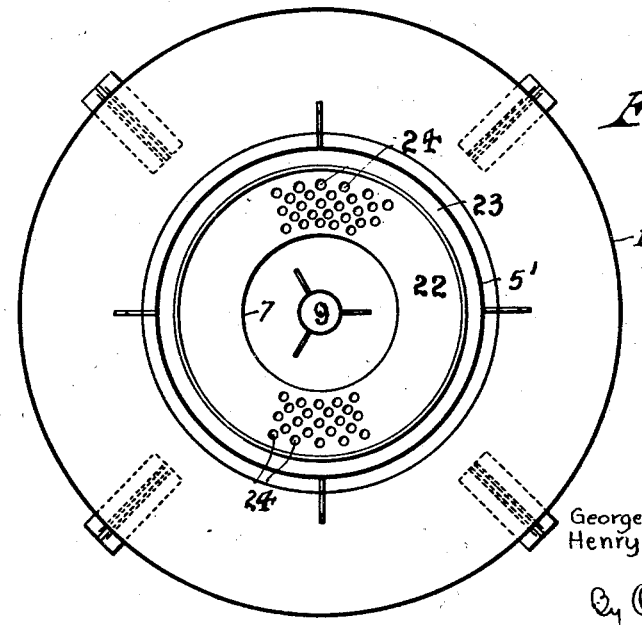
George Rodham Unthank
Henry Arthur John Silley
INVENTORS
their ATTY.

Patented Oct. 31, 1944

2,361,577

UNITED STATES PATENT OFFICE 2,361,577

APPARATUS FOR SEPARATING OIL FROM WATER CONTAMINATED THEREWITH

George Rodham Unthank, New Southgate, London, and Henry Arthur John Silley, London, England Application September 5, 1942, Serial No. 457,498
In Great Britain November 21, 1941

3 Claims. (Cl. 210—61)

This invention relates to apparatus for separating oil from water contaminated therewith and of the kind in which the contaminated water is caused to flow through the apparatus with a number of changes of direction such that the oil may separate by flotation in a number of stages. The first of these stages will be termed "primary separation," while the term "secondary separation" will be applied to any stage subsequent to the primary stage.

In apparatus of this kind the contaminated water is usually introduced slightly below the top of a closed casing and caused to flow downwards through a chamber in which a primary separation takes place, the oil accumulating in a layer at the top of that chamber whence it may be removed from time to time. After passage through the primary separation chamber, the water is caused to flow upwards in a further chamber or passage in which a secondary separation of oil takes place, and then downwards through still another passage and away through an outlet which is usually upwardly directed. In some cases the flow passages are so arranged as to provide more than two separation stages.

With known apparatus, and particularly when the liquid flows under considerable pressure, it is found that in the secondary separation stage or stages there is a marked tendency for some of the oil that is still in the water, to be entrained by the water despite change in the direction of flow, due to turbulence and the velocity of flow of at least some of the water in the region of the entry to the outlet passage leading from the secondary separation chamber.

An object of the present invention is to provide an improved separation apparatus of this kind whereby such entrainment is eliminated or reduced, with consequent increased efficiency of separation.

Further objects of the invention will be apparent from the following description of a preferred embodiment of the invention which is illustrated in the accompanying drawing as applied to a two-stage separator, Fig. 1 being a view in sectional elevation of a complete separator and Fig. 2 a sectional plan view on the line II—II of Fig. 1.

Referring to the drawing, 1 is the outer casing of the separator closed by a cover 2 and divided into two separation chambers 3 and 4 by a concentrically mounted tubular member 5 the upper end of which is joined to the cover of the casing, whilst the lower end rests upon supports 6 in such manner that its edge is spaced from the bottom of the casing.

A further member 7 of circular cylindrical form and of limited axial length is mounted concentrically within member 5 and sealed to the bottom of the chamber, the upper end of said member 7 being open. The wall of the tubular member 5 is of circular cylindrical form to a height corresponding to that of the member 7, and above this height it comprises a part of converging conical form as shown at 5' and finally a circular cylindrical part 5" of smaller diameter than the lowest part.

The inlet for the contaminated water is indicated at 8, being located in the side wall of the casing and at an appropriate distance below the cover 2. The outlet for the treated water consists of a centrally mounted pipe 9 extending vertically from a point near to but spaced from the centre of the bottom of the casing 1, through the top 2, where it is connected to a discharge pipe 10 controlled by a cock 11.

A pipe 12 controlled by a cock 13 serves for the removal of oil collected in the upper part of the chamber 3.

A pipe 14 controlled by cocks 15 and 16 enables tests to be made for the presence of air and scum or air and oil in chambers 3 and 4, and a pipe 17 controlled by a cock 18 enables tests to be made of the depth of the oil accumulated in the upper part of the chamber 3. These pipes 14 and 17 lead for convenience to an observation vessel 19, the outlet from which may be put into communication by cocks 20 and 21 respectively with the oil discharge pipe 12 or with the source of contaminated water (not shown) as the case may be.

A steam coil 25 is preferably fitted within the casing to heat the oil and reduce the viscosity thereof and a drain pipe 26 is provided at the lower end of the casing 1 to permit the latter to be emptied.

A perforated cone 27 is provided within the chamber 3 to distribute the contaminated water entering at the inlet 8 evenly across the transverse area of the chamber 3 in which the primary separation takes place as the water flows downwards.

From the chamber 3 the water, still containing a proportion of oil, passes beneath the lower edge of member 5, then in an upwardly flowing stream between members 5 and 7, into the chamber 4 where a secondary separation takes place, then downwards through the passage defined by member 7 and the exterior of outlet pipe 9, and finally upwards through outlet pipe 9, all as indicated by the arrows in Fig. 1.

In accordance with the present invention a distributing plate 22 is provided extending from the region of the inlet or upper end of member 7 defining the downflow passage from chamber 4 into the path of the preceding upward flow stream between members 5 and 7. The distributing plate 22 is of truncated conical form. Its smaller end is affixed to the inlet end of member 7 and it extends at an upward and outward inclination towards the member 5, its dimensions being such that a free passage 23 is provided between the outer perimeter of the cone and the wall 5.

Perforations are more or less uniformly distributed over the plate 22. A large number of relatively small perforations are employed, i. e. such as to constitute a plurality of rings of perforations one within another. The number and size of the perforations and the size of the distributing plate are selected so that the effective area of the distributing plate surface, namely the total area less the aggregate area of the perforations, as projected on a horizontal plane, is approximately one half the area of the upflow passage between the members 5 and 7.

By the use of a distributing surface arranged as described above the turbulence of the stream in the region where the direction of flow changes from up to down is rectified and a smooth flow is achieved, as indicated by the arrows in Fig. 1, permitting oil globules, which in the absence of the distributing plate would be entrained with water into the downflow within member 7, to acquire a velocity relatively to the water necessary to permit them to pass into the upper part of chamber 4.

We claim:

1. Apparatus for the separation of oil from water contaminated therewith, and including a closed outer casing, a first tubular member depending centrally within said casing from the top thereof to near the bottom thereof, said member constituting the inner wall of a downward-flow passage of annular cross-section, said member having a bottom portion of cylindrical form surmounted by a frusto-conical portion converging upwards, a second tubular member extending upwards from the bottom of said casing centrally within said cylindrical portion up to substantially the level of the top of said cylindrical portion, means for distributing contaminated water around the upper portion of said downward-flow passage, means for discharging water from the neighbourhood of the bottom of the interior of said second tubular member which forms a second downward-flow passage, means for extracting oil from the interior of the upper end of said first tubular member and from the interior of the top of said casing outside said first member, and an annular perforated distributing plate of frusto-conical tubular form extending from the upper end of said second tubular member towards the inner surface of the frusto-conical portion of said first tubular member.

2. Apparatus for the separation of oil from water contaminated therewith, comprising a closed casing capable of being supplied with contaminated water under pressure and containing at least one partition which divides the space within said casing into distinct separating chambers through which the water can be caused to flow in series, one of said chambers arranged to effect a secondary separation containing a partition wall of a height less than that of said chamber and subdividing said chamber into an upward flow passage provided near its bottom with an inlet to receive water from the preceding one of said chambers and a downward flow discharge passage, and a distributing plate having a large number of relatively small perforations distributed over its surface, said plate extending from the upper edge of said partition wall obliquely upwards across said upward flow passage.

3. Apparatus for the separation of oil from water contaminated therewith and having a vertical tubular casing, a first vertical tubular partition dividing the space within said casing into distinct separation chambers, a second vertical tubular partition disposed within the lower part of said first partition, means for admitting contaminated water under pressure to said casing, the path of said water being downwards outside said first tubular partition, upwards between said first and second tubular partitions and again downwards through said second tubular partition, means for discharging separated oil from the upper ends of each of said separation chambers, means for discharging purified water from the lower end of the space within said second tubular partition, and an inverted frusto-conical plate having its smaller end attached to the upper end of said second tubular partition so that it extends upwards and outwards towards said first tubular partition, said plate having perforations distributed over it for rectifying turbulence in the flow of contaminated water passing from the outside to the inside of said second tubular partition.

GEORGE RODHAM UNTHANK.
HENRY ARTHUR JOHN SILLEY.